United States Patent [19]

Althaus

[11] 4,023,410
[45] May 17, 1977

[54] FLUID FLOW METER

[75] Inventor: Robert Althaus, Therwil, Switzerland

[73] Assignee: Aquametro AG, Switzerland

[22] Filed: July 23, 1975

[21] Appl. No.: 598,220

[30] Foreign Application Priority Data

July 24, 1974 Switzerland .................... 10191/74

[52] U.S. Cl. ................................. 73/229; 310/103
[51] Int. Cl.² ...................................... G01F 1/075
[58] Field of Search ................ 73/229, 258, 231 R, 73/253–257; 310/103

[56] References Cited
UNITED STATES PATENTS

| | | | |
|---|---|---|---|
| 2,300,778 | 11/1942 | Cornwell | 310/103 |
| 2,789,434 | 4/1957 | Domsch | 73/257 |
| 3,213,687 | 10/1965 | Forgues | 73/258 X |
| 3,564,919 | 2/1971 | Varga | 73/258 |
| 3,913,399 | 10/1975 | Sheeks | 73/229 |

Primary Examiner—James J. Gill
Attorney, Agent, or Firm—McGlew and Tuttle

[57] ABSTRACT

The meter is provided with a housing defining a metering chamber and with a metering member rotatably supported in the chamber. A first rotary element is drivingly connected to the metering member to be rotatable about a rotational axis. The meter is also provided with an indicator mechanism supported on the housing and provided with a second rotary element rotatable about the rotational axis of the first element and separated therefrom by a wall of substantially non-magnetizable material. Each rotary element is provided with two permanent magnets disposed symmetrically with respect to the rotational axis and having their respective axes of magnetization extending parallel to the rotational axis but being oppositely directed. Each permanent magnet comprises a pair of similarly poled component permanent magnets having respective planar surfaces abutting against one another in a plane extending substantially parallel to the rotational axis of the rotary elements.

7 Claims, 5 Drawing Figures

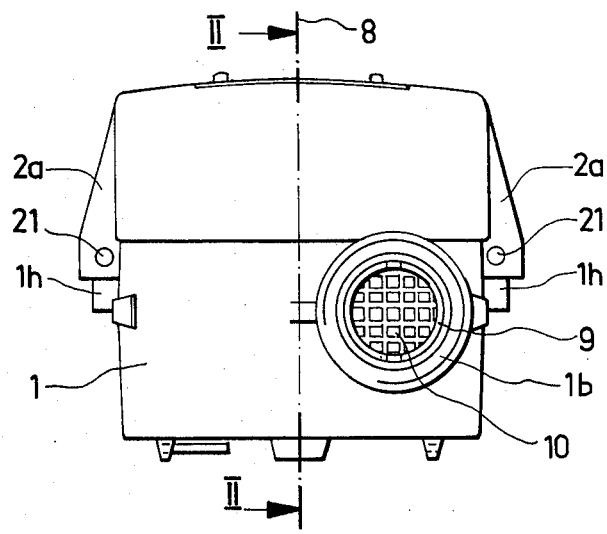
Fig. 1
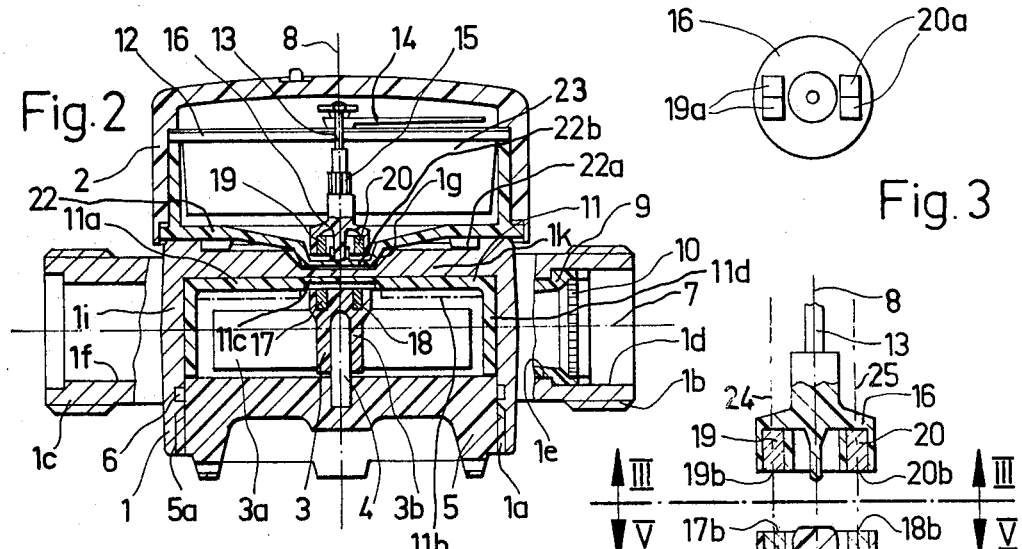
Fig. 2
Fig. 3
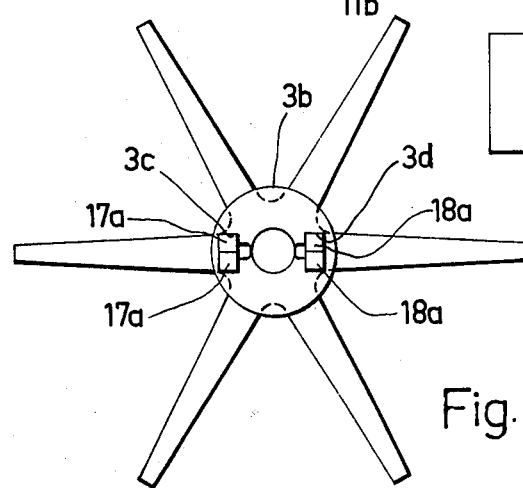
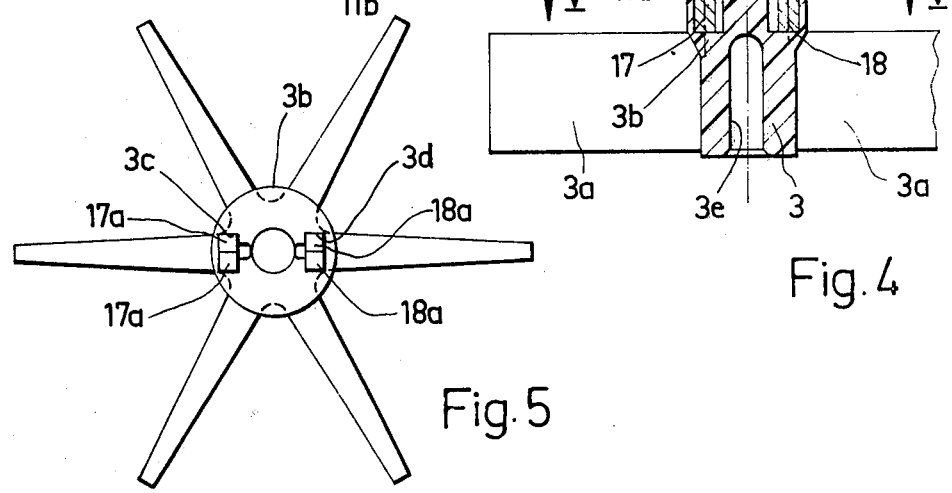
Fig. 4
Fig. 5

FLUID FLOW METER

BACKGROUND OF THE INVENTION

The present invention relates to a flow meter for fluids and provided with a measuring chamber, a measuring organ rotatably journalled therein and a counting mechanism connected with the measuring organ by a magnetic coupling comprising two rotary elements rotatable about a common rotational axis, one of which elements is connected to the measuring organ and the other of which is connected with the counting mechanism, which are separated from one another by a non-magnetic wall and each of which are all provided with two permanent magnets, which are arranged symmetrically relatively to one another with respect to the rotational axis and the magnetic axes of which extend parallel to the rotational axis.

In a known flow meter of this kind, the permanent magnets are arranged in such a manner that their ends facing the non-magnetic wall all have the same polarity. The permanent magnets thus repel one another so that the two magnetic pairs, in the rest position, are displaced relative to one another by a quarter circle.

Tests have shown that a magnetic coupling constructed in such a manner operates unreliably when provided with relatively small one-part permanent magnets of either circular or rectangular cross-section. A magnetic coupling constructed in such a manner is particularly unreliable when abrupt changes in rotational speed occur. This acts particularly disadvantageously for the reason that the drive shaft of the counting mechanism, once the intercoupling has been interrupted, is then no longer entrained with the measuring organ.

This disadvantage could be removed by providing each of the rotary elements with relatively large and powerful permanent magnets. This is, however, impracticable because relatively large axial forces arise in these circumstances and cause correspondingly large frictional forces in the bearings and thus reduce the accuracy of the flow meter.

SUMMARY OF THE INVENTION

According to the present invention there is provided a meter, for measuring flow of fluid, comprising a housing defining a metering chamber, flow rate responsive means rotatably mounted in said chamber, a first rotary element drivingly connected to the flow rate responsive means to be rotatable about a rotational axis, indicating means supported by the housing, a second rotary element connected to the indicating means and mounted to be rotatable about said rotational axis, two first permanent magnets provided on the first rotary element and disposed symmetrically with respect to said rotational axis with their respective axes of magnetisation extending substantially parallel thereto and being oppositely directed, two second permanent magnets provided on the second rotary element and disposed symmetrically with respect to such rotational axis with their respective axes of magnetisation extending substantially parallel thereto and being oppositely directed, and a wall member of substantially non-magnetisable material extending between the first and second rotary elements, each permanent magnet comprising a pair of similarly poled component permanent magnets having respective planar surfaces abutting against one another in a plane extending substantially parallel to said such rotational axis.

For applications which require a higher measurement accuracy, for example in the delivery of heating oil and quantities of petrol, or perhaps in the chemical industry, in the measurement and metering of fluid chemicals, there can also be employed measuring organs which measure the volume directly. For example, a so-called volumetric meter piston can be employed as a measuring organ. Such a piston consists essentially of a hollow cylindrical sleeve, which is tightly closed off at one end face and which is arranged in a hollow cylindrical measuring chamber having a control spigot. The spigot projects into the interior space of the sleeve, the internal diameter of which is greater than the external diameter of the spigot and the external diameter of which is smaller than the internal diameter of the measuring chamber. Furthermore, an inlet opening as well as an outlet opening are provided at suitable locations of the measuring chamber. The sleeve forming the measuring organ, the spigot and the internal walls of the chamber are formed in such a manner that the sleeve, in operation of the flow meter, rolls along the internal wall of the measuring chamber, wherein each full revolution corresponds to an accurately determined volume quantity which is independent of the speed of flow.

Swash plates, spur wheels, or Wankel rotary pistons may also be employed as flow rate responsive means.

BRIEF DESCRIPTION OF THE DRAWINGS

An embodiment of the invention will now be more particularly described by way of example with reference to the accompanying drawing, in which:

FIG. 1 shows an elevational view of a flow meter;

FIG. 2 shows a section through the flow meter along the line II-II in FIG. 1;

FIG. 3 shows a plan view, on an enlarged scale, of part of a magnetic coupling connected to the drive shaft of the counting mechanism, as seen in the direction of the arrows III in FIG. 4;

FIG. 4 shows a schematic section through the magnetic coupling shown in FIG. 3; and FIG. 5 shows a plan view of the turbine wheel as seen in the direction of the arrows V in FIG. 4.

DESCRIPTION OF THE PREFERRED EMBODIMENT

Referring now to the accompanying drawing, the flow meter illustrated in FIGS. 1 and 2 comprises a turbine housing member 1, which consists of a non-magnetic material such as cast brass and which includes a circular portion forming a cover plate 1k and a hollow cylindrical portion forming a shell 1i. The latter is provided at its free end with an internal thread 1a. Screwed into this is a turbine base member 5 which is provided with a corresponding external thread 5a and which consists of non-magnetic material, such as synthetic plastics material. The connection between the turbine housing member 1 and the turbine base member 5 is tightly closed off to the outside by an O-ring 6. The turbine housing member 1 and the turbine base member 5 together form a turbine chamber in which a free-jet turbine wheel 3, consisting of synthetic material and provided with several blades 3a, is journalled to be freely rotatable on a bearing spigot 4. The spigot 4 is arranged in the center of the turbine chamber defined by the housing member 1 and the base member 5 and is firmly connected with the base member 5.

The turbine housing member 1 is provided with a feeder connector stub 1b and with an outlet connector stub 1c. The two stubs 1b and 1c are provided with a stepped bore 1d, 1e or 1f opening into the turbine chamber defined by the housing members 1 and 5. The internal bore of the feeder connector is provided with an outer portion 1d and an inner portion 1e of smaller diameter than the outer portion 1d. The bores 1d and 1e and 1f have a common axis of symmetry 7 and are arranged in such a manner that the axis 7 extends perpendicularly to the rotational axis 8 of the turbine wheel. However, the axes 7 and 8 do not intersect.

A jet 9 is arranged in the opening of the feed connector stub 1b formed by the stepped bore 1d and 1c. Furthermore present in the feed connection stub 1b is a sieve 10 of synthetic material which, in the illustrated embodiment, is inserted into the jet 9. Jet 9 has a slightly conically tapering opening section, of which, in FIG. 2, only the start is visible and the end of which forms the outlet opening of the jet 9. This opening section is inclined at an angle of about 4° to 5° relative to the axis 7, which forms the axis of symmetry of the bores 1d and 1e of the stub 1b and simultaneously the axis of symmetry of the external surface of the jet 9, so that the outlet opening of the jet 9 is displaced relative to the axis 7. The jet 9 sits in the bores 1d and 1e of the stub 1b in such a manner, that it can be turned by an auxiliary setting tool, but does not change its position by itself. By turning the jet 9 about the axis 7, the direction of the jet of fluid and the position of the point at which the latter impinges upon the blades 3a of the wheel 3 may be adjusted. This makes it possible, in a simple manner to calibrate the flow meter.

Furthermore arranged in the turbine chamber defined by the housing members 1 and 5 is a baffle organ 11, which consists of synthetic material and which includes a circular plate portion 11a. The plate portion 11a rests on the internal surface of cover plate portion 1k of the housing member 1. The plate portion 11a is provided with 3 radially extending ribs on its side facing the turbine wheel 3. Two of these ribs are illustrated in FIG. 2 by broken lines and are designated by the reference 11b. The baffle organ 11 is so arranged that the speed of rotation of the metering means, in the form of the turbine wheel 3 over substantially the entire operating range of the meter is proportional to the quantity of fluid flowing through the chamber of the meter per unit time.

In operation of the flow meter, a braking moment is exerted upon the turbine 3 because of bearing friction and because of the coupling of the turbine wheels with the counting mechanism. This braking moment due to friction has a considerable braking effect on the turbine wheel, particularly when the quantity of fluid flowing through the meter is small. The three ribs 11b of the baffle organ 11 generate eddies in the fluid flowing through the chamber of the meter and this eddy formation increases with increasing speed of flow. Thus, although the influence of bearing friction becomes relatively less with increasing speed of flow, that of the eddy formation increases. Therefore, the presence of the baffle organ 11 ensures that the speed of rotation of the wheel 3, in spite of bearing friction, is proportional to the quantity of fluid flowing through per unit time.

A cylindrical depression 11c, the diameter of which is somewhat larger than that of the end part of the hub 3b of the turbine wheel 3 facing the depression 11c, is provided in the center of the plate portion 11a. The baffle organ 11 is bounded on the outside by annular flange 11d which, in the region of each of the two stubs 1b and 1c is, provided with a respective incision or opening.

The flow meter also comprises a two-part indicating means in the form of a counting mechanism housing 2 and 22 consisting of synthetic material. The housing consists of a transparent cap 2 and the counting mechanism body 22 and is closed off against the outside to be vacuum-tight. The interior of counting mechanism housing 2 and 22 is evacuated during assembly, so that its two housing parts 2 and 22 are held together by the air pressure. The counting mechanism, designated as a whole by 23, is accommodated in the counting mechanism housing 2 and 22. Of this, the scale 12, the drive shaft 13, the pointer 14 and the pinion 15 sitting fast fixed on the shaft 13, are illustrated in FIG. 2.

The shell 1i of the turbine housing member 1 is provided with two dogs 1h, which are disposed opposite one another and each of which is provided with a bore. The cap 2 of the counting mechanism housing is provided with two mounting plates 2a, which are U-shaped in cross-section and which can be pushed over the dogs 1h, and which each of is also provided with a bore aligned with the corresponding bore of the dog. The bores of the dogs 1h and the mounting blades 2a receive connecting elements 21, such as rivets or screws, whereby the housing member 1 of the turbine chamber and the cap 2 of the counting mechanism housing are releasably connected with one another. By this connection, the base member 22, resting by its reinforcement dogs 22a on the end face of the turbine housing 1, is secured simultaneously.

The cover plate 1k of the turbine housing member 1 is provided with a central depression 1g, the wall thickness of which is substantially thinner than in that of the remaining region of the cover plate 1k. The base member 22 of the counting mechanism is provided with a central lug 22b, which projects into the depression 1g, and the wall thickness of which is likewise somewhat less than that of the remaining bottom sections.

This construction of the cover plate 1k of the turbine housing member 1 and of the base member 22 of the counting mechanism makes it possible to couple the rotational turbine wheel 3 with the counting mechanism 23 by a magnetic coupling. The magnetic coupling, shown separately in FIGS. 3 to 5, is formed essentially by the hub 3b of the rotatable turbine wheel 3 and by a spigot 16 fixed on the drive shaft 13 of the counting mechanism. The hub 3b has a blind bore 3e, which is open towards the base member 5 of the turbine housing and into which the bearing spigot 4 projects. At its end facing the counting mechanism 23, the hub 3b is provided with two openings 3c and 3d disposed diametrally opposite one another. Pressed into each of these is a respective permanent magnet 17 and 18. Each permanent magnet 17 and 18 consists of two partial magnets 17a and 18a each of which is square in cross-section. As is evident from FIGS. 4 and 5, the two partial magnets 17a abut against one another in a plane which is parallel with, and preferably radial to, the rotational axis 8. The same applies analogously to the two partial magnets 18a.

The two permanent magnets 17 and 18 are magnetized in such a manner, that their respective axes of magnetisation 24 and 25 extend parallel to the rotational axis 8 of the wheel 3, but their directions of polarization are oppositely directed so that, for example, the end faces 17b, which face the counting mechanism 23, of the two partial magnets 17a form a north pole and the corresponding end faces 18b of the two partial magnets 18 form a south pole.

The spigot 16, at its end face facing the turbine wheel 3, is likewise provided with two openings, in which respective permanent magnets 19 and 20 are disposed. Each of the latter consists likewise of two component permanent magnets 19a and 20a, square in cross-section, which each abut under bias against one another by planar surfaces 2 parallel to the rotational axis 8. The permanent magnets 19 and 20 are magnetized in such a manner that the component magnet end faces 19b, facing the turbine wheel 3, form a south pole and the corresponding component magnet end faces 20b form a north pole. The magnets 17 and 19 or 18 and 20 thus attract one another in pairs and cause rotation of the respective rotary elements in such a manner that the magnets of respectively opposite magnetic polarities tend to align themselves axially with one another.

The length of each of the partial magnets 17a, 18a, 19a and 20a, measured in the direction of the magnetic axes 24 and 25, is, for example, about 4 millimeters and the width of each partial magnet is, for example, about 2 millimeters, so that their length is approximately twice as great as their width. The spacing between the magnetic axes 24 and 25 of the magnets 19 and 20, diametrically aligned with one another, is preferably within the range of between threefold and sixfold the width of the component magnets 17a, 18a, 19a and 20a. Furthermore, the spacing between the axes 24 and 25 should be at least equal to 1.2-fold, and preferably about equal to 1.5-fold of the spacing between the mutually facing ends 17b and 19b/18b and 20b of the partial magnets 17a and 19a/18a and 20a, aligned with one another. The partial magnets 17a, 18a, 19a and 20a may, for example, consist of sintered iron oxide. The hub 3b and the rotary spigot 16, which are separated from one another by an air-tight double wall, namely the cover plate 1k and the base member 22 of the counting mechanism housing, thus form respective rotary elements each of which is rotatable about the rotational axis 8 and which are magnetically coupled with one another.

In operation, in which the maximum speed of rotation of the turbine wheel 3 amounts up to about 1800 revolutions per minute, the magnetic coupling between hub 3b and spigot 16 provides reliable transmission of the rotation of the turbine wheel 3 to the drive shaft 13 of the counting mechanism 23. Tests have shown that the rotary motion is transmitted unobjectionably even in the case of jerky changes in rotational speed. When one perhaps stops and afterwards again releases the drive shaft 13 of the counting mechanism with the turbine wheel 3 rotating, then it is almost at once again synchronously co-rotated even at high rotational speed.

It is thus possible to employ relatively small and weak magnets and therefore only relatively small axial forces are also generated by the magnetic coupling. This has the advantage that only small bearing friction arises, so that the flow meter measures very accurately.

I claim:

1. A meter for measuring flow of fluid comprising, in combination:
    a housing defining a metering chamber;
    flow rate responsive means rotatably mounted in said chamber;
    a first rotary element of non-magnetizable material drivingly connected to said flow rate responsive means to be rotatable about a rotational axis;
    indicating means supported by said housing;
    a second rotary element of non-magnetizable material connected to said indicating means and mounted to be rotatable about said rotational axis
    two magnetically separated first permanent magnets each provided on said first rotary element and disposed symmetrically with respect to said rotational axis with their respective axes of magnetisation extending substantially parallel thereto and being oppositely directed;
    two magnetically separated second permanent magnets each provided on said second rotary element and disposed symmetrically with respect to said rotational axis with their respective axes of magnetisation extending substantially parallel thereto and being oppositely directed; and
    a wall member of substantially non-magnetisable material extending between said first and second rotary elements;
    each said permanent magnet comprising a pair of similarly poled physically separate, component permanent magnets having respective planar surfaces abutting against one another in a plane extending substantially parallel to said rotational axis.

2. A meter as defined in claim 1, wherein said second rotary element is rotatably supported by said housing in a second chamber separated from said metering chamber by said wall member of substantially non-magnetisble material.

3. A meter as defined in claim 1, wherein each said plane extends radially with respect to said rotational axis.

4. A meter as defined in claim 1, wherein each said component permanent magnet is of substantially square cross-section in a plane extending perpendicularly to said rotational axis.

5. A meter as defined in claim 1, wherein each component permanent magnet has a longitudinal dimension extending substantially parallel to said rotational axis, said longitudinal dimension being substantially twice that of the width dimension extending perpendicularly to said rotational axis.

6. A meter as defined in claim 1, wherein the spacing between longitudinal axes of symmetry of the respective magnets of each said rotary element, in a plane perpendicular to said rotational axis is substantially equal to between three and six times the width dimension of each component permanent magnet.

7. A meter as defined in claim 1, wherein the spacing between longitudinal axes of symmetry of the respective permanent magnets of each said rotary element, in a plane perpendicular to said rotational axis, is substantially equal to one and one half times the spacing between mutually facing poles of corresponding permanent magnets in said rotary elements.

* * * * *